INVENTORS
HENRY G. HOEHMANN
BJARNE JUNGE
JAMES L. LYON

United States Patent Office 3,337,159
Patented Aug. 22, 1967

3,337,159
PNEUMATIC ISOLATION BUFFER
Henry G. Hoehmann, Bjarne Junge, and James L. Lyon, Los Gatos, Calif., assignors to International Business Machines Corporation, Armonk, N.Y., a corporation of New York
Filed Sept. 24, 1965, Ser. No. 489,827
5 Claims. (Cl. 243—29)

This invention relates to pneumatic systems in general and more particularly to a pneumatic isolation buffer.

The art of pneumatic conveying is a relatively well developed art and is exemplified by the pneumatic conveying tube systems utilized in large department stores, banks, etc. In these prior art systems, normally a number of terminals are connected to a main pneumatic tube which in turn is terminated at a work station such as the accounting department of a department store or bookkeeping section of a bank. Insertion of a carrier into the system by a human operator along with appropriate setting of the pneumatic path would cause the carrier to pass to the desired station. Numerous schemes for guiding the carriers from one station to another have been devised. One system provided the carriers with settable magnetic slugs which set up the path as the carrier moved through the system. Others used settable protrusions on the carriers to operate the pneumatic switches in the system.

These systems were therefore designed to provide physical communication from one point to another through human intervention at both ends of the system. While many of the pneumatic techniques of the older prior art systems are still useful, the overall systems concept of the prior art system is severely lacking and because of the requisite human intervention is not conducive to automated control. Another problem with the prior art systems was that often the complete pneumatic system would be tied up during transport of one carrier from a terminal to its destination. Thus, none of the other carriers could be started through the system. While this does not make the system completely unworkable, it did severely hamper the throughput capabilities of it. Additionally, once inserted into the pneumatic system, the carrier traveled without interruption to its destination. Thus, no buffering or overlap of operation was provided.

It is therefore an object of the present invention to provide a novel pneumatic buffer.

Another object of the present invention is to provide a pneumatic buffer which is operable to decelerate a cell which is traveling into it from its I/O tube as well as decelerate a cell which is returning to it from the main transport channel and then deliver the decelerated cell to the main transport channel or the I/O tube, respectively.

Another object of the present invention is to provide a two position pneumatic buffer which in its first position is operable to pneumatically isolate the main transport channel from the buffer and provide a pneumatic supply to its I/O tube and operable in a second position to provide pneumatics to the main transport channel.

Other and further objects and advantages of the invention will be apparent from the following more particular description of the preferred embodiment of the invention, as illustrated in the accompanying drawings in which:

FIG. 5 is a pneumatic control system for use with the pneumatic buffer.

The pneumatic buffer is a two tube cell buffer which permits pneumatic communication through it. It delivers or receives a cell from its associated I/O tube to or from the main transport channel. The pneumatic buffer comprises two mechanically coupled tube sections which are rotatable within a substantially airtight enclosure to either of two positions, 90° apart. At the first position, the through tube section of the buffer which is pneumatically sealed from the enclosure is aligned with the main transport tube. In this first position, the other tube, the buffer tube, which is pneumatically opened to the enclosure is aligned with the I/O tube. At the second position, the buffer tube is rotated into alignment with the main transport tube such that application of pressure to the enclosure causes the cell to be ejected from the buffer tube, through the main transport tube. During the time that the buffer tube is in alignment with the main transport tube, a flag seals the main transport tube. Additionally, the I/O tube is sealed by means of a butterfly valve to prevent pneumatic loss.

Figure 2:
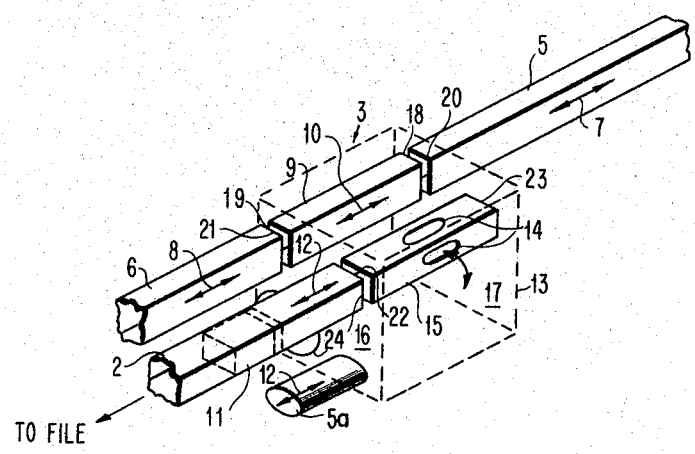
FIG. 2 is an isometric view of the novel pneumatic buffer showing its outer casing or enclosure in dotted lines for simplicity of description.

In the following description of FIGS. 2, 3 and 4 like numbers will be assigned to like components. In FIG. 2, there is shown a detailed isometric view of the subject novel pneumatic buffer designated generally as 3. Entering the right-hand side of the pneumatic buffer 3 from the I/O terminal is the main transport tube 5, while entering the left-hand side of the pneumatic buffer 3 is the main transport tube 6. As shown generally in FIG. 2, a cell in the portion of the tube 5 could be propelled in one of two directions as illustrated by the arrow 7 and a cell in the main channel portion 6 again could travel in two directions as illustrated by the arrow 8. Likewise, the tube portion 9 of the pneumatic buffer 3 passes cells in both directions as shown by the arrow 10. The I/O tube 2 of FIG. 2 is shown with a carrier or cell 11 within it which can move in both directions as illustrated by arrow 12 to transport the cells from I/O tube to the pneumatic buffer 3 or from the pneumatic buffer 3 into the I/O tube. As further shown in FIG. 2, a pneumatic supply is applied to the pneumatic buffer 3 through tube 5a. Again, the pneumatic supply applied to tube 5a is reversible as is indicated by the arrow 12. For purposes of simplicity, the pneumatic supply will not be shown in FIGS. 2, 3 and 4.

The pneumatic supply is connected through the tube 5a to the airtight enclosure 13 which is shown in dotted lines for purposes of clarity. This pneumatic supply communicates through openings 14 in a buffer tube 15 contained in the airtight enclosure 13. As shown in FIG. 2, the two tubes 9 and 15 in the pneumatic buffer 3 are in a first position wherein the buffer tube 15 is in pneumatic and mechanical communication with the I/O tube 2 through the end wall 16 of the enclosure 13. The walls 16 and 17 of the airtight enclosure 13 are paralleled such that the tubes 9 and 15 may be rotated therein as will hereinafter be more fully explained. In this first position, the through tube 9 is aligned in mechanical and pneumatic communication with the portions 5 and 6 of the main channel such that it is completed through the pneumatic buffer 3. The ends 18 and 19 are in sealing contact with the ends 20 and 21 of the main channel tubes 5 and 6, respectively. Thus, a tight pneumatic communication between the through tube 9 and the two portions 5 and 6 is established when the tubes of the buffer are in the first position. Again, tight pneumatic communication is, in the first position, established between the ends 22 of the buffer tube 15 and the end 24 of the I/O tube 2. The opposite end 23 of the buffer tube 15 is in sealing engagement with the end wall 17 of the enclosure 13 for reasons as will hereinafter be explained. Thus, in this first position, application of vacuum through tube 5a to the airtight enclosure 13 will act through the openings 14 in the buffer tube 15 to cause a cell 11 to be drawn toward the buffer 3 through the I/O tube 2.

As the cell 11 travels through the I/O tube 2 it accelerates to a relatively high velocity and as is obvious, it must be decelerated prior to its movement into the main channel. The arrangement of the buffer tube 15 accomplishes this deceleration since as the cell 11 moves through the buffer tube 15 past the openings 14, it builds up pressure in the portion of the tube adjacent the end 23 since that end of the buffer tube is in substantially airtight contact with the wall 17. Thus, deceleration is accomplished. While vacuum is applied through the tube 5a to the airtight enclosure 13, the through tube portion 9 is substantially pneumatically sealed from the interior of the airtight enclosure 13. Thus, through pneumatic communication is established through the pneumatic buffer 3 for the main channel.

Figure 1:
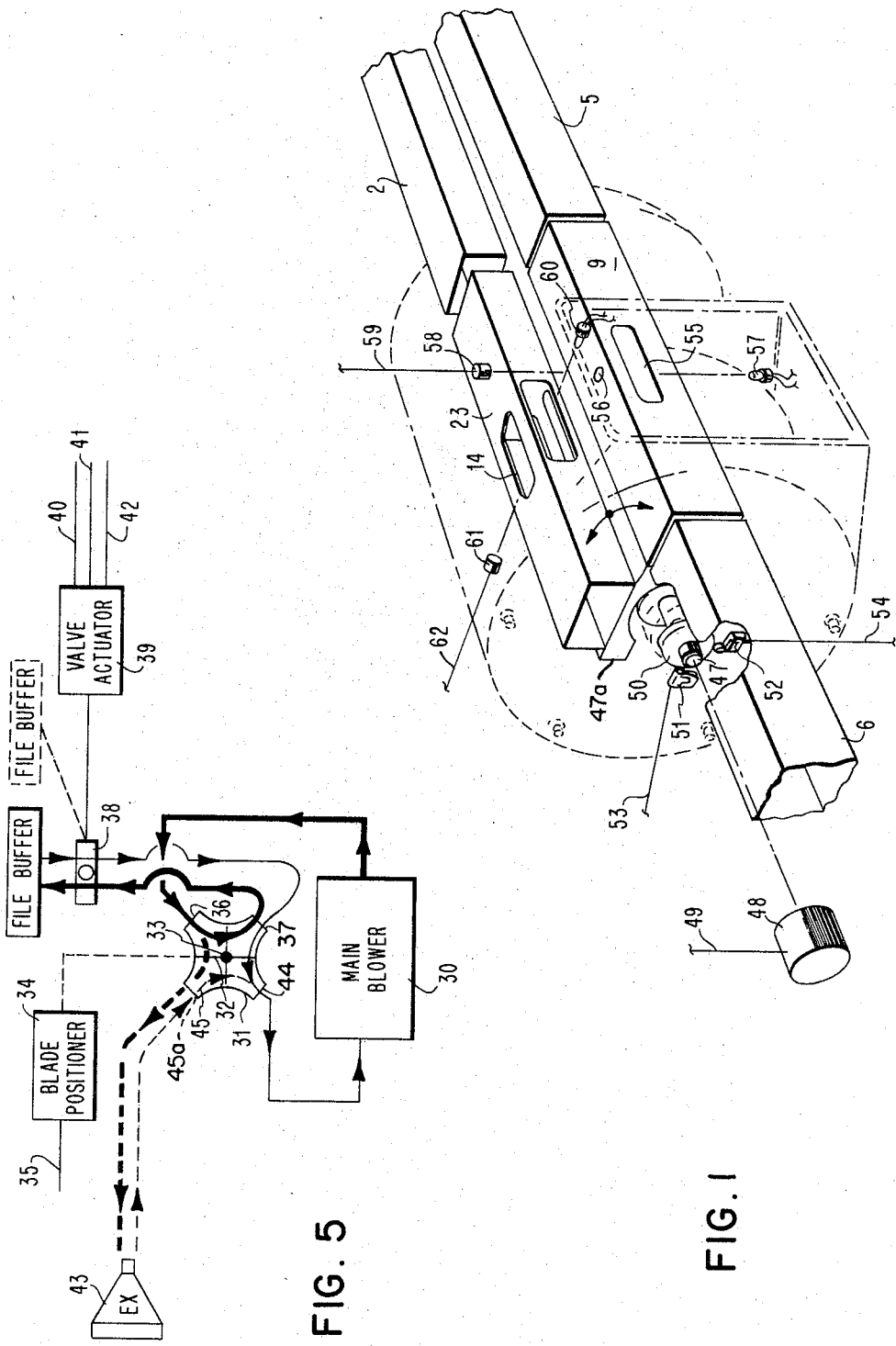
FIG. 1 is a detailed view of a pneumatic buffer showing controlling and sense points.
Figure 3:
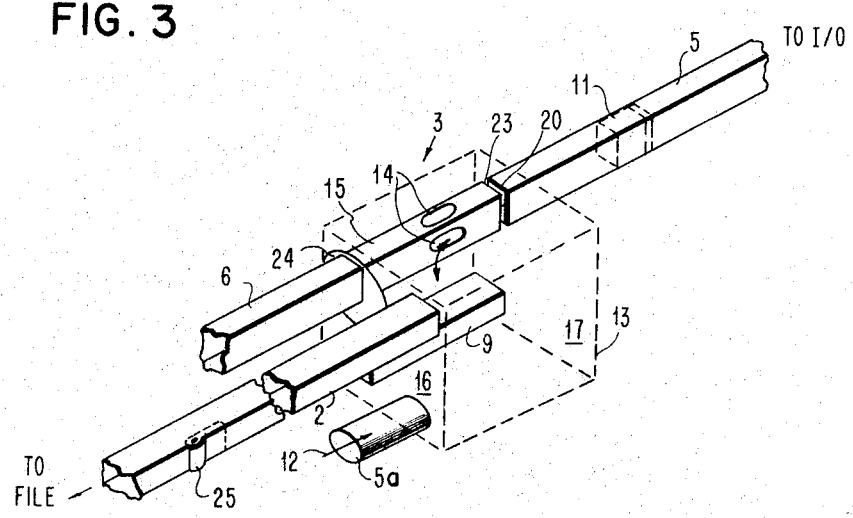
FIG. 3 is an isometric view of the herein described pneumatic buffer with the buffer set up such that a cell is being returned to the buffer from the main transport channel.
Figure 4:
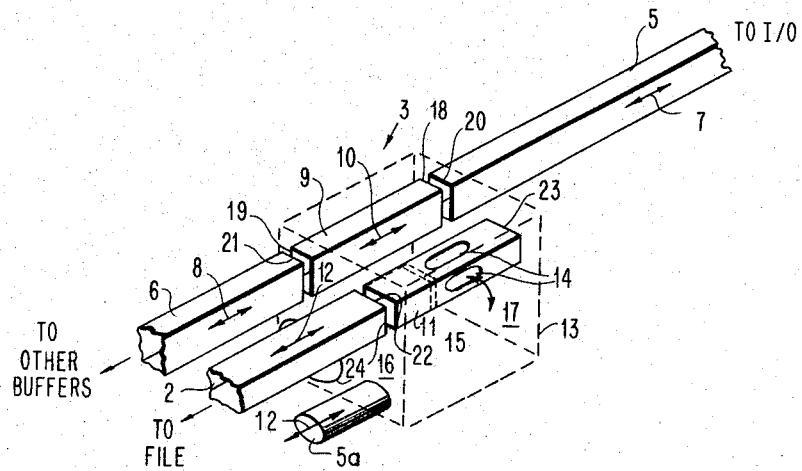
FIG. 4 is an isometric view of the pneumatic buffer in the same position as that of FIG. 1 wherein the buffer is in pneumatic communication with the I/O tube and is mechanically and pneumatically isolated from the main channel.

As shown in FIG. 1 the tubes 9 and 15 in the buffer are mechanically connected to member 47a to shaft 47 for movement into the position as shown in FIG. 3 from that of FIG. 2 and vice versa. Likewise, as shown in FIG. 2, a flag 24 is provided adjacent the end 16 of the airtight enclosure 13 which in the first position is inoperable while in FIG. 3, the second position has been moved into place between the main channel portion and the buffer tube 15.

For a more detailed description, refer next to FIG. 3 wherein the pneumatic buffer 3 is shown in the second position in which the buffer tube portion 15 has been moved into alignment with the main channel portions 5 and 6. In this second position, the through tube channel portion 9 has been moved out of alignment with the main channel portions 5 and 6. The actual position of the through tube portion 9 in this second position is not material since it has no effect on the operation of the buffer in the second position. In the second position, the cell 11 which had been received from I/O tube in the first position is resting in alignment with the main channel portions 5 and 6 in the portion of the buffer tube 15 adjacent its end 23. Application of pressure through tube 5 to the airtight enclosure 13 will pass through the openings 14 of the buffer tube portion 15 to cause the cell 11 to be ejected from the pneumatic buffer tube 3 into the main channel portion 5. Thus, the cell will be propelled by means of pressure applied through the pneumatic buffer 3.

There is additionally shown in FIG. 3 a valve 25 which is operable by means not shown such that the file I/O is effectively blocked from the airtight enclosure 13 when the buffer is in the second operable position.

The flag 24 which seals the airtight enclosure 13 from the main channel portion 6 is also in substantially airtight engagement with the end of tube 22 of buffer tube 15. Thus, when the cell 11 is to be returned from the main channel section 5, vacuum is applied to the enclosure 13. The cell 11 will then travel at a relatively high rate of speed through the main channel portion 5 into the buffer portion 15 and after it passes the openings 14 in the buffer tube portion 15, it will no longer be propelled by means of pneumatic force and will decelerate in the portion of the buffer tube 15 adjacent the end 22 as was the case on the opposite end of the buffer tube 15 when the cell was drawn from the file into the pneumatic buffer 3. Once the cell has returned to the pneumatic buffer 3 and is residing in the end of the buffer tube 15, adjacent the end 22 thereof, the two tubes 9 and 15 are then moved back to position one and at the same time the flag 24 is moved out of engagement with the main channel section 6 into the position as illustrated in FIGS. 2 and 4.

In FIG. 4, the cell is again residing in the buffer tube 15 while the buffer tube is in alignment with the I/O tube 2. Application of pressure to the airtight enclosure 13 through tube 5 will cause the cell to move from the buffer tube 15 out through the I/O tube 2. The valve 25 is, of course, opened to allow passage.

In the preceding description, mention has been made of the placement of the openings 14 in the buffer tube 15 which allow the cell 11 to decelerate. This deceleration is important not only so that the cell will not slam into the buffer or its components thereby damaging the cell but equally important is the arrangement of the buffer tube so that once the cell has passed the openings 14, it then decelerates in the portion of the tube adjacent the point where it will be exited from the buffer tube. Thus, in FIG. 3, the cell was decelerated and remained in the end of the tube adjacent main channel section 5 such that upon application of pressure to the airtight enclosure 13, the cell was transported out of the buffer while in FIG. 4, the cell deceleration was accomplished in the end of the buffer tube 15 adjacent the end 22 such that application of pressure to the airtight enclosure 13 will cause the cell to be propelled through the I/O tube 2. Thus, the positioning of the cell relative to the openings 14 is another important feature of the buffer tube 15.

FIG. 5 is a schematic illustration of the pneumatic supply and valving for use in supplying pneumatic flow to the file buffers. In FIG. 5, flow is depicted with the solid heavy lines depicting pressure to the system; solid fine lines depicting vacuum to the system; heavy dashed lines depicting pressure flow when vacuum is applied to the system, and fine dashed lines depicting vacuum flow when pressure is applied to the system.

A main blower 30 is utilized to provide the pneumatic supply with pressure coming out of its right side and vacuum at its left side as shown. The pressure flow from the blower passes through an exhaust valve 31 including a valve blade 32 which is rotatable into one of two positions by a shaft 33. Means 34 are mechanically coupled to the shaft 33 to selectively position it into one of its two positions responsive to an input signal appearing on line 35. The blade 32 is shown in FIG. 5 in its first position wherein pressure enters the valve opening 36 and exits from the valve opening 37 into the buffer select valve 38. The buffer select valve 38 is merely a routing valve 38. The buffer select valve 38 is merely a routing valve such that the pneumatic supply may be selectively coupled to one of the file buffers. A valve actuator 39 is mechanically coupled to the valve 38 and is provided an input along lines 40, 41 and 42 to cause the valve 38 to connect a selected file buffer with the pneumatic supply. This valve 38 may be of any conventional type of pneumatic routing valve.

With the blade 32 in the position as shown in FIG. 5, the pressure from the main blower 30 is directed, as previously stated, into the valve 38. Input to the main blower on its vacuum side is through the exhaust 43. When the blade 32 is rotated into the position as shown in dotted lines, which is a 90° rotation from that of the first position, the valve is then in the vacuum mode. Thus, vacuum will be applied through the valve 38 to the selected file buffer through valve opening 37 and valve inlet 44 into the main blower. With the blade in this position, pressure from the main blower will then flow into valve opening 36 and out of valve opening 45a.

In FIG. 1 is shown a more detailed view of the heretofore described file buffer with the I/O tube 2 and the through tube sections 5 and 6 rearranged to illustrate another mode of operation to the file buffer. In FIG. 1 as shown, the through tube section 9 and the buffer tube section 23 are mounted for rotation on member 47a fixedly attached to shaft 47 which is selectively rotated into one of two positions by a moving means 48 under control of an input signal applied along line 49. Attached to the shaft 47 is a cam 50 which is in operable association with microswitches 51 and 52 which furnish position signals along lines 53 and 54, respectively. Additionally, in the file buffer of FIG. 1, a transparent window 55 is provided and transparent openings 56 are provided in the through tube section for purposes of sensing the arrival of a cell. In operable association with the openings 56, when the buffer is in the position as shown in FIG. 1, is a light source 57 and photocell 58 which provides a signal along line 59 when a cell enters it through tube section 9. This same light 57 and photocell 58 arrangement is also operable when the buffer tube section is rotated into alignment with the main transport channel sections 5 and 6 to sense the arrival of a cell therein. Additionally, a light source 60 and a photocell 61 are in operable communication through the openings 14 of the buffer tube 23 to sense the arrival of a cell into the buffer tube from the I/O tube 2. The photocell 62 furnishes a signal along line 62 whe nthe cell arrives in the buffer tube section 23.

In summary, there has been provided a pneumatic buffer 3 which is a two tube cell buffer which permits pneumatic communication through it and delivers or receives a cell 11 from its associated I/O tube to or from the main transport tube 5. The pneumatic buffer comprises two mechanically coupled tube sections 9 and 15 which are rotatable within a substantially airtight encluosure 13 to either of two positions 90° apart. At the first position, the through tube section 9 of the buffer 3 which is pneumatically sealed from the enclosure is aligned with the main transport tube portions 5 and 6. In this first position, the other tube, the buffer tube 15, which is pneumatically open to the enclosure, through openings 14 is aligned with tube 2 such that when vacuum is applied to the enclosure 13, a cell 11 is drawn from the tube 2. At the second position, the buffer tube 15 is rotated into alignment with the main transport tube 5 such that application of pressure to the enclosure 13 causes the cell 11 to be ejected from the buffer tube 15 through the main transport tube 5. During the time that the buffer tube is in alignment with the main transport tube, a flag 24 seals the main transport tube 6 from the other buffers and acts to decelerate the cell upon return from the main transport channel to accomplish positioning and prevents damage to the cell.

It will be appreciated by those skilled in the art that while there has been illustrated a pneumatic buffer wherein the I/O tube and the main channel tubes are rotated 90° with respect to each other, that this is not important and that the alignment of the tubes may be parallel. Additionally, while rectangular pneumatic tubes are shown, the configuration of the tubes may be of any cross section and will be determined by the cross section of the carriers.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A pneumatic buffer comprising:
   a substantially airtight enclosure including first and second end members;
   a main transport channel connected to said airtight enclosure through both said first and second end members;
   an I/O tube connected to said airtight enclosure through said first end member;
   a through tube section within said airtight enclosure and pneumatically sealed therefrom;
   a buffer tube section within said airtight enclosure and in pneumatic communication therewith;
   said through tube section and said buffer tube section being movable into a first position into alignment with said main transport channel and said I/O tube, respectively; and
   said through tube section and said buffer tube section being movable into a section position wherein said buffer tube section is in alignment with said main transport channel.

2. The buffer of claim 1 further including means for pneumatically sealing the main transport channel connected to said first end of said airtight enclosure when said tubes are in said second position.

3. The buffer of claim 1 further including means for applying vacuum or pressure to said airtight enclosure when said tubes are in said first or second positions.

4. The buffer of claim 2 further including means for applying vacuum or pressure to said airtight enclosure when said tubes are in said first or second positions.

5. The buffer of claim 1 further including a deceleration chamber formed by the extremity of said buffer tube section adjacent said second end member and said second end member in said first position, and by the extremity of said buffer tube section adjacent said first end member and a flag member movable into sealing relationship therewith when said buffer tube is moved from said first position to said second position.

References Cited

UNITED STATES PATENTS 1,753,989    4/1930    Hohne _____ 243—31

FOREIGN PATENTS 478,807    1/1938    Great Britain.

EVON C. BLUNK, *Primary Examiner.*

H. C. HORNSBY, *Assistant Examiner.*